(12) United States Patent
Beilfuss et al.

(10) Patent No.: US 9,927,134 B2
(45) Date of Patent: Mar. 27, 2018

(54) AIR CONDITIONER UNITS HAVING IMPROVED MAKE-UP AIR MODULE COMMUNICATION

(71) Applicant: General Electric Company, Schenectady, NY (US)

(72) Inventors: Robert Charles Beilfuss, Fisherville, KY (US); Thomas Allen Bailey, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 163 days.

(21) Appl. No.: 14/923,819

(22) Filed: Oct. 27, 2015

(65) Prior Publication Data

US 2017/0115015 A1 Apr. 27, 2017

(51) Int. Cl.
*F25B 49/00* (2006.01)
*F24F 3/14* (2006.01)
*F24F 1/02* (2011.01)
*F24F 11/00* (2018.01)
*F24F 13/20* (2006.01)
*F24F 13/10* (2006.01)

(52) U.S. Cl.
CPC ............ *F24F 3/1405* (2013.01); *F24F 1/027* (2013.01); *F24F 11/008* (2013.01); *F24F 11/0079* (2013.01); *F24F 13/10* (2013.01); *F24F 13/20* (2013.01); *F24F 2003/1446* (2013.01); *F24F 2011/0013* (2013.01); *F24F 2011/0016* (2013.01); *F24F 2011/0071* (2013.01); *F24F 2011/0082* (2013.01); *F24F 2011/0083* (2013.01); *F24F 2011/0089* (2013.01); *F25B 2700/21171* (2013.01)

(58) Field of Classification Search
None
See application file for complete search history.

(56) References Cited

U.S. PATENT DOCUMENTS

| 4,457,357 A * | 7/1984 | Van Arnhem ......... F24F 3/1405 165/224 |
| 2012/0324928 A1 | 12/2012 | Durham et al. |
| 2015/0143825 A1* | 5/2015 | Qu ........................ F25D 21/004 62/80 |

* cited by examiner

*Primary Examiner* — Keith Raymond
*Assistant Examiner* — Nicholas R Hector
(74) *Attorney, Agent, or Firm* — Dority & Manning, P.A.

(57) ABSTRACT

Air conditioner units are provided. A unit includes an outdoor heat exchanger, an indoor heat exchanger, and a compressor. The unit further includes a bulkhead disposed between the outdoor heat exchanger and the indoor heat exchanger. The unit further includes a vent aperture defined in the bulkhead. The unit further includes a dehumidification system disposed at least partially within the outdoor portion, the dehumidification system including an evaporator configured for removing heat from outdoor air flowing therethrough, a condenser configured for adding heat to outdoor air flowing therethrough, and an auxiliary compressor in fluid communication with the evaporator and the condenser. The unit further includes a temperature sensor disposed within the outdoor portion, a humidity sensor disposed within the outdoor portion, and a controller in communication with the compressor, the auxiliary compressor, the temperature sensor, and the humidity sensor, the controller configured to operate the compressor and the auxiliary compressor.

20 Claims, 4 Drawing Sheets

AIR CONDITIONER UNITS HAVING IMPROVED MAKE-UP AIR MODULE COMMUNICATION

FIELD OF THE INVENTION

The present disclosure relates generally to air conditioner units, and more particularly to air conditioner units which utilize dehumidification systems and which provide make-up air therethrough.

BACKGROUND OF THE INVENTION

Air conditioner units are conventionally utilized to adjust the temperature within structures such as dwellings and office buildings. In particular, one-unit type room air conditioner units may be utilized to adjust the temperature in, for example, a single room or group of rooms of a structure. A typical such air conditioner unit includes an indoor portion and an outdoor portion. The indoor portion is generally located indoors, and the outdoor portion is generally located outdoors. Accordingly, the air conditioner unit generally extends through a wall, window, etc. of the structure.

In the outdoor portion of a conventional air conditioner unit, a compressor that operates a refrigerating cycle is provided. At the back of the outdoor portion, an outdoor heat exchanger connected to the compressor is disposed, and facing the outdoor heat exchanger, an outdoor fan for cooling the outdoor heat exchanger is provided. At the front of the indoor portion of a conventional air conditioner unit, an air inlet is provided, and above the air inlet, an air outlet is provided. A blower fan and a heating unit may additionally be provided in the indoor portion. Between the blower fan and heating unit and the air inlet, an indoor heat exchanger connected to the compressor is provided.

When cooling operation starts, the compressor is driven to operate the refrigerating cycle, with the indoor heat exchanger serving as a cold-side evaporator of the refrigerating cycle, and the outdoor heat exchanger as a hot-side condenser. The outdoor heat exchanger is cooled by the outdoor fan to dissipate heat. As the blower fan is driven, the air inside the room flows through the air inlet into the air passage, and the air has its temperature lowered by heat exchange with the indoor heat exchanger, and is then blown into the room through the air outlet. In this way, the room is cooled.

When heating operation starts, the compressor may be driven to operate a heat pump cycle, with the indoor heat exchanger serving as a hot-side condenser and the outdoor heat exchanger as a cold-side evaporator. The heating unit may additionally be operated to raise the temperature of air in the air passage. As the blower fan is driven, the air inside the room flows through the air inlet into the air passage, and the air has its temperature raised by heat exchange with the indoor heat exchanger, and is then blown into the room through the air outlet. In this way, the room is heated.

Further, conventional air conditioner units include a bulkhead which is positioned between the indoor portion and outdoor portion, and thus generally separates the components within the indoor portion from the components in the outdoor portion. Various components may additionally be connected to the bulkhead, such as the blower fan and heating unit.

In some cases, it may be desirable to allow outdoor air through the bulkhead into a room into which the air conditioner unit extends. Accordingly, many bulkheads include vent apertures for allowing such airflow. However, issues may occur when the outdoor air being flowed through the vent aperture is, for example, at a relatively high humidity level and/or relatively high temperature level. Such air may, for example, cause discomfort to a user of the air conditioner appliance. To resolve this issue, some air conditioner units include apparatus for dehumidifying air that is flowed through such vent apertures.

However, further improvements may be desirable when utilizing vent apertures and dehumidification apparatus. For example, in known air conditioner units which utilize such dehumidification apparatus, there is no communication between the dehumidification apparatus and the main thermodynamic assembly of the air conditioner unit. Operation of the dehumidification apparatus is thus independent of operation of the main thermodynamic assembly, and the dehumidification apparatus and main thermodynamic assembly utilize separate sensors on which their operation is based.

Accordingly, improved air conditioner units are desired. In particular, air conditioner units which can provide make-up air as desired and which can provide communication between the dehumidification apparatus and main thermodynamic assembly thereof would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, an air conditioner unit is provided. The unit includes an outdoor heat exchanger disposed in an outdoor portion, an indoor heat exchanger disposed in an indoor portion, and a compressor in fluid communication with the outdoor heat exchanger and the indoor heat exchanger. The unit further includes a bulkhead disposed between the outdoor heat exchanger and the indoor heat exchanger along a transverse direction, the bulkhead defining the indoor portion and the outdoor portion. The unit further includes a vent aperture defined in the bulkhead. The unit further includes a dehumidification system disposed at least partially within the outdoor portion, the dehumidification system including an evaporator configured for removing heat from outdoor air flowing therethrough, a condenser configured for adding heat to outdoor air flowing therethrough, and an auxiliary compressor in fluid communication with the evaporator and the condenser. The unit further includes a temperature sensor disposed within the outdoor portion, a humidity sensor disposed within the outdoor portion, and a controller in communication with the compressor, the auxiliary compressor, the temperature sensor, and the humidity sensor, the controller configured to operate the compressor and the auxiliary compressor.

In accordance with another embodiment, an air conditioner unit is provided. The unit includes an outdoor heat exchanger disposed in an outdoor portion, an indoor heat exchanger disposed in an indoor portion, and a compressor in fluid communication with the outdoor heat exchanger and the indoor heat exchanger. The unit further includes a bulkhead disposed between the outdoor heat exchanger and the indoor heat exchanger along a transverse direction, the bulkhead defining the indoor portion and the outdoor portion. The unit further includes a vent aperture defined in the bulkhead, and a blower fan disposed in the indoor portion. The unit further includes a dehumidification system disposed at least partially within the outdoor portion, the dehumidification system comprising a fan, an evaporator configured for removing heat from outdoor air flowing therethrough, a condenser configured for adding heat to outdoor air flowing therethrough, and an auxiliary compressor in fluid communication with the evaporator and the condenser. The unit further includes a temperature sensor disposed within the outdoor portion, a humidity sensor disposed within the outdoor portion, and a controller in communication with the compressor, the auxiliary compressor, the blower fan, the fan, the temperature sensor, and the humidity sensor, the controller configured to operate the compressor and the auxiliary compressor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
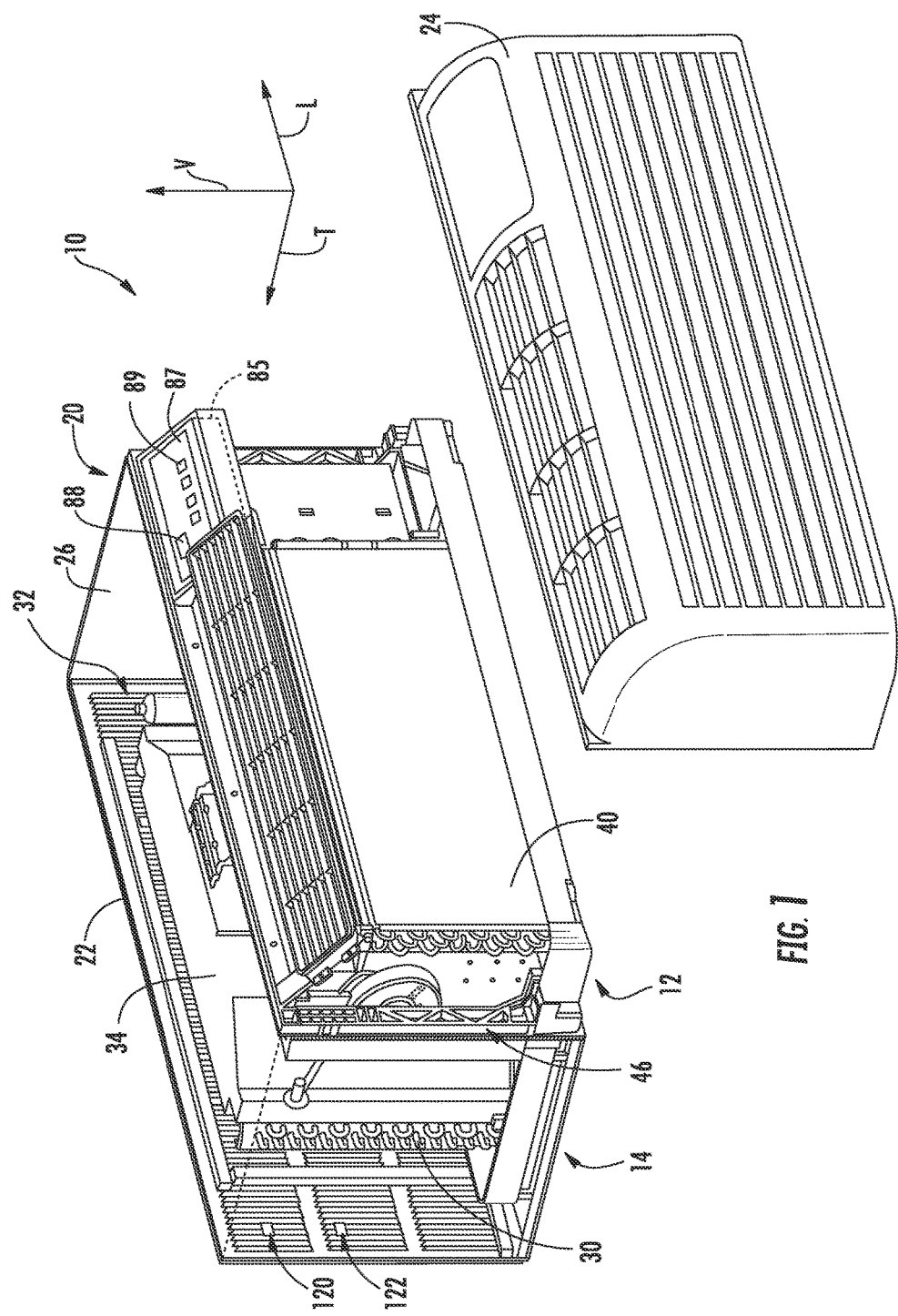
FIG. 1 provides a perspective view of an air conditioner unit, with a room front exploded from a remainder of the air conditioner unit for illustrative purposes, in accordance with one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, an air conditioner unit 10 is provided. The air conditioner unit 10 is a one-unit type air conditioner, also conventionally referred to as a room air conditioner. The unit 10 includes an indoor portion 12 and an outdoor portion 14, and generally defines a vertical direction V, a lateral direction L, and a transverse direction T. Each direction V, L, T is perpendicular to each other, such that an orthogonal coordinate system is generally defined.

A housing 20 of the unit 10 may contain various other components of the unit 10. Housing 20 may include, for example, a rear grill 22 and a room front 24 which may be spaced apart along the transverse direction by a wall sleeve 26. The rear grill 22 may be part of the outdoor portion 14, which the room front 24 is part of the indoor portion 12. Components of the outdoor portion 14, such as an outdoor heat exchanger 30, outdoor fan (not shown), and compressor 32 may be housed within the wall sleeve 26. A casing 34 may additionally enclose the outdoor fan, as shown.

Figure 2:
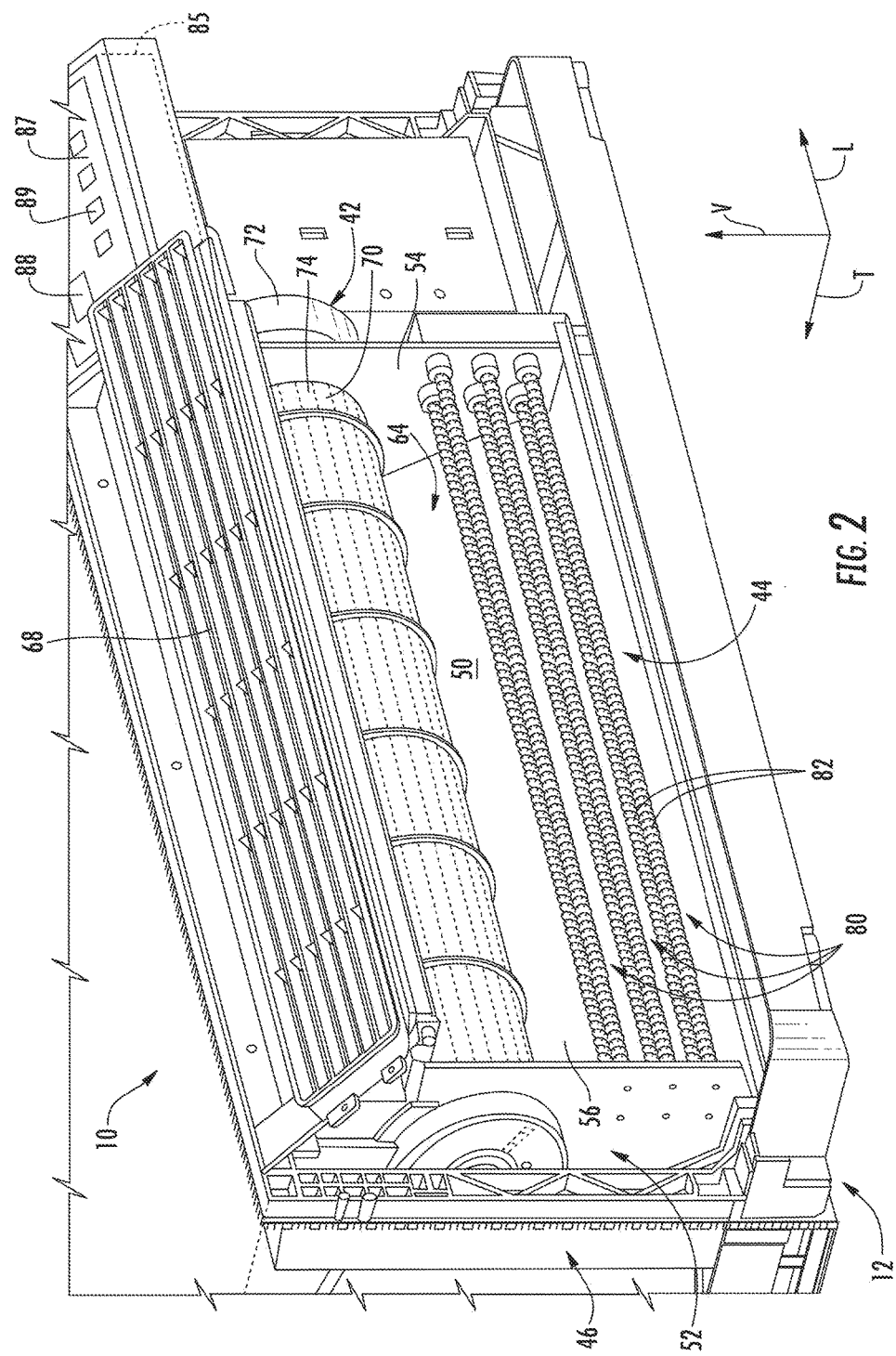
FIG. 2 is a perspective view of components of an indoor portion of an air conditioner unit in accordance with one embodiment of the present disclosure.

Referring now also to FIG. 2, indoor portion 12 may include, for example, an indoor heat exchanger 40, a blower fan 42, and a heating unit 44. These components may, for example, be housed behind the room front 24. Additionally, a bulkhead 46 may generally support and/or house various other components or portions thereof of the indoor portion 12, such as the blower fan 42 and the heating unit 44. Bulkhead 46 may generally separate and define the indoor portion 12 and outdoor portion 14.

Outdoor and indoor heat exchangers 30, 40 may be components of a thermodynamic assembly which may alternately be operated as a refrigeration assembly (and thus perform a refrigeration cycle) or a heat pump (and thus perform a heat pump cycle). The assembly may, for example, further include compressor 32 and expansion valve, both of which may be in fluid communication with the heat exchangers 30, 40 to flow refrigerant therethrough as is generally understood. The assembly may additionally include a reversing valve, as is generally understood. When the assembly is operating in a cooling mode and thus performs a refrigeration cycle, the indoor heat exchanger 40 acts as an evaporator and the outdoor heat exchanger 30 acts as a condenser. When the assembly is operating in a heating mode and thus performs a heat pump cycle, the indoor heat exchanger 40 acts as a condenser and the outdoor heat exchanger 30 acts as an evaporator. The outdoor and indoor heat exchangers 30, 40 may each include coils 31, 41, as illustrated, through which a refrigerant may flow for heat exchange purposes, as is generally understood.

Bulkhead 46 may include various peripheral surfaces that define an interior 50 thereof. For example, and additionally referring to FIG. 3, bulkhead 46 may include a first sidewall 52 and a second sidewall 54 which are spaced apart from each other along the lateral direction L. A rear wall 56 may extend laterally between the first sidewall 52 and second sidewall 54. The rear wall 56 may, for example, include an upper portion 60 and a lower portion 62. Upper portion 60 may for example have a generally curvilinear cross-sectional shape, and may accommodate a portion of the blower fan 42 when blower fan 42 is housed within the interior 50. Lower portion 62 may have a generally linear cross-sectional shape, and may be positioned below upper portion 60 along the vertical direction V. Rear wall 56 may further include an indoor facing surface 64 and an opposing outdoor facing surface. The indoor facing surface 64 may face the interior 50 and indoor portion 12, and the outdoor facing surface 66 may face the outdoor portion 14.

Bulkhead 46 may additionally extend between a top end 61 and a bottom end 63 along vertical axis V. Upper portion 60 may, for example, include top end 61, while lower portion 62 may, for example, include bottom end 63.

Bulkhead 46 may additionally include, for example, an air diverter 68, which may extend between the sidewalls 52, 54 along the lateral direction L and which may flow air therethrough.

In exemplary embodiments, blower fan 42 may be a tangential fan. Alternatively, however, any suitable fan type may be utilized. Blower fan 42 may include a blade assembly 70 and a motor 72. The blade assembly 70, which may include one or more blades disposed within a fan housing 74, may be disposed at least partially within the interior 50 of the bulkhead 46, such as within the upper portion 60. As shown, blade assembly 70 may for example extend along the lateral direction L between the first sidewall 52 and the second sidewall 54. The motor 72 may be connected to the blade assembly 70, such as through the housing 74 to the blades via a shaft. Operation of the motor 72 may rotate the blades, thus generally operating the blower fan 42. Further, in exemplary embodiments, motor 72 may be disposed exterior to the bulkhead 46. Accordingly, the shaft may for example extend through one of the sidewalls 52, 54 to connect the motor 72 and blade assembly 70.

Heating unit 44 in exemplary embodiments includes one or more heater banks 80. Each heater bank 80 may be operated as desired to produce heat. In some embodiments as shown, three heater banks 80 may be utilized. Alternatively, however, any suitable number of heater banks 80 may be utilized. Each heater bank 80 may further include at least one heater coil or coil pass 82, such as in exemplary embodiments two heater coils or coil passes 82. Alternatively, other suitable heating elements may be utilized.

The operation of air conditioner unit 10 including compressor 32 (and thus the thermodynamic assembly generally) blower fan 42, heating unit 44, and other suitable components may be controlled by a processing device such as a controller 85. Controller 85 may be in communication (via for example a suitable wired or wireless connection) to such components of the air conditioner unit 10. By way of example, the controller 85 may include a memory and one or more processing devices such as microprocessors, CPUs or the like, such as general or special purpose microprocessors operable to execute programming instructions or microcontrol code associated with operation of unit 10. The memory may represent random access memory such as DRAM, or read only memory such as ROM or FLASH. In one embodiment, the processor executes programming instructions stored in memory. The memory may be a separate component from the processor or may be included onboard within the processor.

Unit 10 may additionally include a control panel 87 and one or more user inputs 89, which may be included in control panel 87. The user inputs 89 may be in communication with the controller 85. A user of the unit 10 may interact with the user inputs 89 to operate the unit 10, and user commands may be transmitted between the user inputs 89 and controller 85 to facilitate operation of the unit 10 based on such user commands. A display 88 may additionally be provided in the control panel 87, and may be in communication with the controller 85. Display 88 may, for example be a touchscreen or other text-readable display screen, or alternatively may simply be a light that can be activated and deactivated as required to provide an indication of, for example, an event or setting for the unit.

Figure 3:
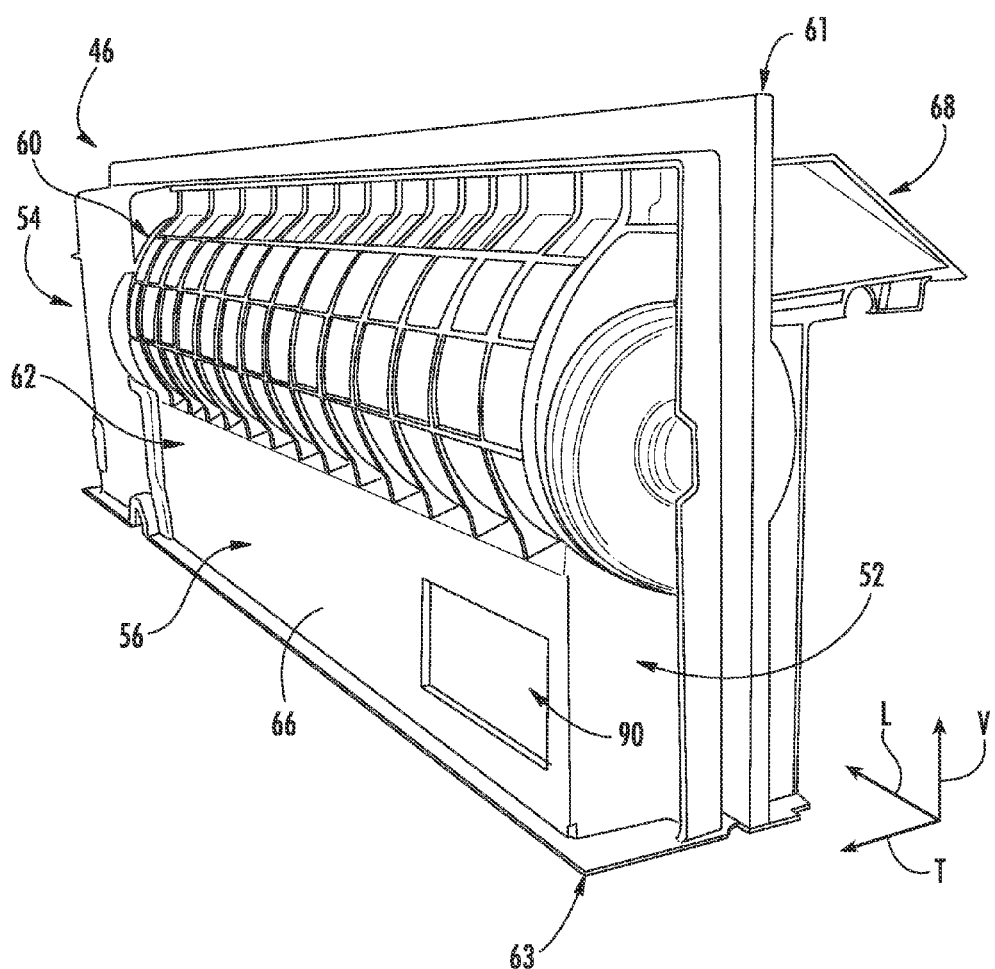
FIG. 3 is a rear perspective view of a bulkhead assembly in accordance with one embodiment of the present disclosure.

Referring briefly to FIG. 3, a vent aperture 90 may be defined in the rear wall 56 of bulkhead 46. Vent aperture 90 may allow air flow therethrough between the indoor portion 12 and outdoor portion 14, and may be utilized in an installed air conditioner unit 10 to allow outdoor air to flow therethrough into the indoor portion 12.

As discussed, in some cases it may be desirable to treat air being flowed through the vent aperture 90. For example, outdoor air which has a relatively high humidity level and/or temperature level may require treating before being flowed through vent aperture 90 from outdoor portion 14 to indoor portion 12. Accordingly, and referring now to FIG. 4, air conditioner unit 10 may further include a dehumidification system 100. Dehumidification system 100 may be utilized to treat outdoor air, also known as make-up air, flowing therethrough and through vent aperture 90.

Dehumidification system 100 generally includes the components required for operation of a refrigeration cycle. At least a portion of the dehumidification system 100 may be disposed within the outdoor portion 14. For example, as illustrated, dehumidification system 100 may include an evaporator 102 and a condenser 104, both of which may be disposed in the outdoor portion 14. Evaporator 102 is generally configured for removing heat from outdoor air flowing therethrough, while condenser 104 is generally configured for adding heat to outdoor air flowing therethrough. Evaporator 102 may be any suitable heat exchanger configured to operate as an evaporator, and in particular may be a suitable indirect heat exchanger such as a microchannel evaporator. Outdoor air may generally be flowed through the evaporator 102. During such flow through the evaporator 102 the outdoor air may transmit heat to a suitable refrigerant being flowed through the evaporator 102, thus cooling the outdoor air. Additionally, such heat dump may cause moisture condensation from the outdoor air. Such condensation removes moisture from the outdoor air, such that the outdoor air exiting the evaporator 102 may be relatively cooler and dryer than the outdoor air entering the evaporator 102.

Condenser 104 may be any suitable heat exchanger configured to operate as a condenser, and in particular may be a suitable indirect heat exchanger such as a microchannel condenser. Outdoor air, such as in some embodiments the outdoor air flowing from the evaporator 102, may generally be flowed through the condenser 104. During such flow through the condenser 104 the refrigerant may transmit heat to the outdoor air being flowed through the condenser 104, thus heating the outdoor air. Accordingly, the outdoor air exiting the condenser 104 may be relatively hotter than the outdoor air entering the condenser 104.

As illustrated, dehumidification system 100 may further include an auxiliary compressor 106 and an expansion device 108, both of which may be in fluid communication with the evaporator 102 and condenser 104 to flow refrigerant therethrough as is generally understood. In exemplary embodiments as illustrated, auxiliary compressor 106 and expansion device 108 may be disposed in the outdoor portion 14. Expansion device 108 may, for example, be a capillary tube as illustrated or another suitable expansion device configured for use in a refrigeration cycle. Various lines may additionally be provided for flowing refrigerant between the various components of the dehumidification device 100, such as the evaporator 102, condenser 104, auxiliary compressor 106 and expansion device 108, and thus providing the fluid communication there between. Refrigerant may thus flow through such lines from evaporator 102 to auxiliary compressor 106, from auxiliary compressor 106 to condenser 104, from condenser 104 to expansion device 108, and from expansion device 108 to evaporator 102. The refrigerant may generally undergo phase changes associated with a refrigeration cycle as it flows to and through these various components, as is generally understood. One suitable refrigerant for use in dehumidification system 100 is 1,1,1,2-Tetrafluoroethane, also known as R-134A, although it should be understood that the present disclosure is not limited to such example and rather that any suitable refrigerant may be utilized.

Dehumidification system 100 may further include a fan 110, which may operate to encourage the flow of outdoor air through the evaporator 102 (and condenser 104 in embodiments as shown) and therethrough to the vent aperture 90.

Accordingly, fan 110 may be positioned upstream of the evaporator 102 along the flow direction of outdoor air through the evaporator 102, and may operate to push air through the evaporator 102 (and condenser 104). Alternatively, fan 110 may be disposed downstream of the evaporator 102 along the flow direction of outdoor air through the evaporator 102, and may operate to pull air through the evaporator 102 (and condenser 104). Fan 110 may, in some embodiments as illustrated, be disposed within outdoor portion 14. Additionally or alternatively, fan 110 may be partially or wholly disposed in vent aperture 90 or partially or wholly disposed in indoor portion 12. Accordingly, outdoor air flow through evaporator 102 may be flowed past fan 110 into and through vent aperture 90.

Figure 4:
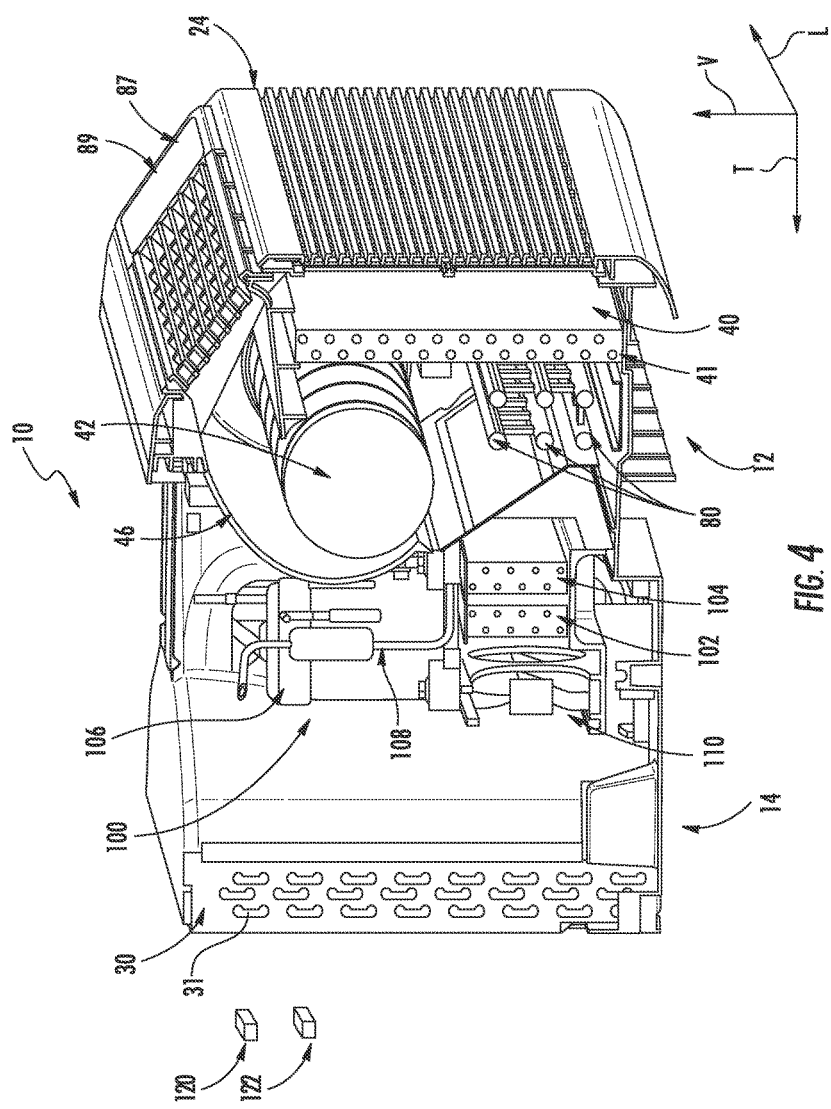
FIG. 4 is a perspective section view of components of an air conditioner unit in accordance with one embodiment of the present disclosure.

Referring now to FIGS. 1 and 4, unit 10 may further include a temperature sensor 120 and a humidity sensor 122. The temperature sensor 120 and the humidity sensor 122 may, for example, be disposed within the outdoor portion 14, and may be configured to measure the temperature and relative humidity, respectively, of outdoor air. Any suitable temperature sensor and humidity sensor may be utilized in accordance with the present disclosure. As discussed herein, temperature sensor 120 and humidity sensor 122 may be utilized to control operation of the main thermodynamic assembly and the dehumidification system 100. Accordingly, temperature sensor 120 and humidity sensor 122 may be in communication with the main thermodynamic assembly and the dehumidification system 100, such as through controller 85.

As discussed, air conditioner unit 10 may include a controller 85. Controller 85 may additionally be in communication with temperature sensor 120 and humidity sensor 122, and may further be in communication with dehumidification system 100 (such as with the auxiliary compressor 106 and fan 110 thereof), and may thus be configured to operate dehumidification system 100 and the various components thereof. For example, in exemplary embodiments, controller 85 may be configured to activate the dehumidification system 100 (such as the auxiliary compressor 106 thereof to operate in a refrigeration cycle) when an outdoor humidity level (such as in the outdoor portion 14) is above a predetermined humidity threshold and/or an outdoor temperature (such as in the outdoor portion 14) is above a predetermined temperature threshold. Controller 85 may further be configured to deactivate the dehumidification system 100 (such as the auxiliary compressor 106 thereof) when an outdoor humidity level (such as in the outdoor portion 14) is below the predetermined humidity threshold and/or an outdoor temperature (such as in the outdoor portion 14) is below the predetermined temperature threshold. The predetermined humidity threshold may, for example, be between approximately 40% and approximately 70% relative humidity, such as between approximately 50% and approximately 60% relative humidity, such as approximately 55% relative humidity. The predetermined temperature threshold may, for example, be between approximately 40° F. and approximately 60° F., such as approximately 50° F. The sensors 120, 122 may be in communication with the controller 85 such that the controller 85 receives the temperature and humidity levels from the sensor 120, 122 and can activate and deactivate the dehumidification system 100 (such as the auxiliary compressor 106 thereof) as required.

Additionally, controller 85 may be configured to operate fan 110. In exemplary embodiments, fan 110 may be constantly active when the air conditioner unit 10 is operational, i.e. when the unit 10 is on and the compressors 32, 106 are each active or inactive. Such constant operation of the fan 110 may facilitate the constant supply of outdoor air into the indoor portion 12 and thus into a room in which the unit 10 is installed.

Controller 85 may thus be configured to operate both the compressor 32 and the auxiliary compressor 106, and may thus advantageously facilitate communication between the main thermodynamic assembly (and compressor 32 thereof) and the auxiliary thermodynamic assembly (and auxiliary compressor 106 thereof). Operations of the compressor 32 and auxiliary compressor 106 can thus advantageously be utilized to the benefit of both systems. Controller 85 can transmit and receive signals from both systems, such that operations thereof are no longer entirely independent of one another, which can advantageously allow the unit 10 to operate in a manner which provides increased user comfort and/or which provides increased efficiency.

One particular advantage is that operation of the compressor 32 and/or auxiliary compressor 106 can be based on signals from the temperature sensor 120 and/or the humidity sensor 122. Signals in accordance with the present disclosure are generally data signals transmitted to the controller 85 from the temperature sensor 120 and the humidity sensor 122, and which include temperature and humidity values sensed by the temperature sensor 120 and humidity sensor 122, respectively. Operation of the compressor 32 and/or auxiliary compressor 106 based on these signals means that, at various times during use of the unit 10, the compressor 32 and/or auxiliary compressor 106 may be activated and/or deactivated based on a temperature received from temperature sensor 120 and/or, at various times during use of the unit 10, the compressor 32 and/or auxiliary compressor 106 may be activated and/or deactivated based on a temperature received from humidity sensor 122.

Controller 85 may additionally advantageously be configured to operate the blower fan 42 and the fan 110, such as based on signals from the temperature sensor 120 and/or the humidity sensor 122.

For example, in some embodiments, the controller 85 may activate the blower fan 42 when an outdoor temperature sensed by the temperature sensor 120 is below a predetermined temperature threshold. Such activation may advantageously reduce "cold-spots" in the indoor portion 12 by spreading out cold air (i.e. air below the threshold) that is being flowed in through vent aperture 90. The threshold may, for example, be between approximately 35° F. and approximately 70° F., such as between approximately 45° F. and approximately 65° F., such as between approximately 50° F. and approximately 60° F. Such activation may occur, for example, when the blower fan 42 is not already or otherwise active.

In exemplary embodiments, such activation of the blower fan 42 may occur when the unit 10 is in heating mode. For example, controller 85 may, based on instructions transmitted thereby to the compressor 32 and thermodynamic assembly generally, sense whether current operation is in a heating mode or a cooling mode. The current mode of operation may, for example, determine the manner in which various subsequent steps are carried out. Notably, the thermodynamic assembly being generally in a particular mode does not require that the assembly generally is active. Rather, being in a particular mode may require only that the thermodynamic assembly is configured for activation in that particular mode and/or was active in that particular mode immediately prior to such determination by controller 85.

Further, in exemplary embodiments, such activation of the blower fan 42 may occur when the compressor 32 is inactive, and thermodynamic assembly in general is thus inactive.

In some embodiments, controller 85 may further be configured to initiate a defrost cycle based on signals from the temperature sensor 120 and the humidity sensor 122. A defrost cycle generally is a cycle which occurs periodically when the thermodynamic assembly is in the heating mode, and includes switching from operation in the heating mode to operation (such as active operation) in the cooling mode (and turning off the outdoor fan) for a (relatively short) period of time. This allows any frost built up on the outdoor heat exchanger 30 to melt away. The operation is then switched back to operation in the heating mode. Accordingly, such initiation may occur when, for example, the unit 10 is in the heating mode (and in exemplary embodiments active in the heating mode).

In some embodiments, the defrost cycle may be initiated when an outdoor temperature sensed by the temperature sensor 120 is below a predetermined threshold and an outdoor humidity level sensed by the humidity sensor 122 is above a predetermined threshold. Additionally or alternatively, controller 85 may be configured to calculate outdoor dew point temperatures based on outdoor temperatures sensed by the temperature sensor 120 and outdoor humidity levels sensed by the humidity sensor 122. The defrost cycle may be initiated when the outdoor door point temperature calculated by the controller 85 is above a predetermined threshold.

Notably, various predetermined thresholds as discussed herein may, in some embodiments, be empirically determined and programmed into controller 85. Additionally or alternatively, various predetermined thresholds as discussed herein may be user adjustable, such as via user interaction with unit 10 via user inputs 89.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An air conditioner unit, comprising:
an outdoor heat exchanger disposed in an outdoor portion;
an indoor heat exchanger disposed in an indoor portion;
a compressor in fluid communication with the outdoor heat exchanger and the indoor heat exchanger;
a bulkhead disposed between the outdoor heat exchanger and the indoor heat exchanger, the bulkhead defining the indoor portion and the outdoor portion;
a vent aperture defined in the bulkhead in fluid communication between the outdoor heat exchanger and the indoor heat exchanger to permit an airflow therethrough;
a dehumidification system disposed at least partially within the outdoor portion in fluid communication with the outdoor heat exchanger, the dehumidification system comprising an evaporator configured for removing heat from outdoor air flowing therethrough, a condenser configured for adding heat to outdoor air flowing therethrough, and an auxiliary compressor in fluid communication with the evaporator and the condenser;
a temperature sensor disposed within the outdoor portion;
a humidity sensor disposed within the outdoor portion; and
a controller in communication with the compressor, the auxiliary compressor, the temperature sensor, and the humidity sensor, the controller configured to operate the compressor and the auxiliary compressor.

2. The air conditioner unit of claim 1, wherein the dehumidification system further comprises a fan, the fan in communication with the controller.

3. The air conditioner unit of claim 2, wherein the fan is constantly active when the air conditioner unit is operational.

4. The air conditioner unit of claim 1, further comprising a blower fan disposed in the indoor portion, the blower fan in communication with the controller.

5. The air conditioner unit of claim 4, wherein the controller is configured to activate the blower fan when an outdoor temperature sensed by the temperature sensor is below a predetermined temperature threshold.

6. The air conditioner unit of claim 5, wherein the activation occurs when the compressor is inactive.

7. The air conditioner unit of claim 5, wherein the activation occurs when the air conditioner unit is in a heating mode.

8. The air conditioner unit of claim 1, wherein the controller is configured to initiate a defrost cycle based on signals from the temperature sensor and the humidity sensor.

9. The air conditioner unit of claim 8, wherein the initiation occurs when the air conditioner unit is in a heating mode.

10. The air conditioner unit of claim 1, wherein the controller is configured to calculate an outdoor dew point temperature based on an outdoor temperature sensed by the temperature sensor and an outdoor humidity level sensed by the humidity sensor.

11. The air conditioner unit of claim 1, wherein the controller is configured to activate the auxiliary compressor when an outdoor humidity level sensed by the humidity sensor is above a predetermined humidity threshold.

12. An air conditioner unit, comprising:
an outdoor heat exchanger disposed in an outdoor portion;
an indoor heat exchanger disposed in an indoor portion;
a compressor in fluid communication with the outdoor heat exchanger and the indoor heat exchanger;
a bulkhead disposed between the outdoor heat exchanger and the indoor heat exchanger, the bulkhead defining the indoor portion and the outdoor portion;
a vent aperture defined in the bulkhead in fluid communication between the outdoor heat exchanger and the indoor heat exchanger to permit an airflow therethrough;
a blower fan disposed in the indoor portion;
a dehumidification system disposed at least partially within the outdoor portion in fluid communication with the outdoor heat exchanger, the dehumidification system comprising a fan, an evaporator configured for removing heat from outdoor air flowing therethrough, a condenser configured for adding heat to outdoor air flowing therethrough, and an auxiliary compressor in fluid communication with the evaporator and the condenser;
a temperature sensor disposed within the outdoor portion;
a humidity sensor disposed within the outdoor portion; and a controller in communication with the compressor, the auxiliary compressor, the blower fan, the fan, the temperature sensor, and the humidity sensor, the controller configured to operate the compressor and the auxiliary compressor.

13. The air conditioner unit of claim 12, wherein the fan is constantly active when the air conditioner unit is operational.

14. The air conditioner unit of claim 12, wherein the controller is configured to activate the blower fan when an outdoor temperature sensed by the temperature sensor is below a predetermined temperature threshold.

15. The air conditioner unit of claim 14, wherein the activation occurs when the compressor is inactive.

16. The air conditioner unit of claim 14, wherein the activation occurs when the air conditioner unit is in a heating mode.

17. The air conditioner unit of claim 12, wherein the controller is configured to initiate a defrost cycle based on signals from the temperature sensor and the humidity sensor.

18. The air conditioner unit of claim 17, wherein the initiation occurs when the air conditioner unit is in a heating mode.

19. The air conditioner unit of claim 12, wherein the controller is configured to calculate an outdoor dew point temperature based on an outdoor temperature sensed by the temperature sensor and an outdoor humidity level sensed by the humidity sensor.

20. The air conditioner unit of claim 12, wherein the controller is configured to activate the auxiliary compressor when an outdoor humidity level sensed by the humidity sensor is above a predetermined humidity threshold.

* * * * *